UNITED STATES PATENT OFFICE 2,430,031

BETAINE DERIVATIVE COMPOSITIONS

Sol Shappirio, Washington, D. C.

No Drawing. Application June 26, 1944,
Serial No. 542,255

17 Claims. (Cl. 260—398.5)

This invention relates to glyceride containing compositions, to additions therefor, and to methods of making such additions and compositions and to their utilization, particularly to additions based on betaines and their modifications.

Among the objects of the present invention is the production of glyceride compositions containing betaine derivatives which have a beneficiating effect on said glycerides.

Other objects include the production of novel betaine derivatives for such utilization.

Still further objects and advantages will appear from the more detailed description set forth below, it being understood, however, that this more detailed description is given by way of illustration and explanation only, and not by way of limitations, since various changes therein may be made by those skilled in the art without departing from the scope and spirit of the present invention.

In accordance with the present invention it has been found that compounds such as betaines and other compounds disclosed in application Serial No. 154,937, filed July 21, 1937, entitled Antioxidants, now Patent No. 2,217,711, granted October 15, 1940; and compositions and materials derived from betaines disclosed in application Serial No. 361,151, filed October 14, 1940, entitled Compositions containing antioxidants, now Patent No. 2,352,229, granted June 27, 1944; may be treated and new derivatives produced for utilization which greatly enhance the beneficiating properties such as antioxidant characteristics of the materials in glyceride compositions and for other utilities. The present application is a continuation-in-part of the stated applications identified immediately above.

In explanation of the present invention it is desirable to point out the material disclosed in the prior specifications above identified. In Serial No. 154,937 there are described and claimed particularly antioxidants which may be either chemical entities or synthesized chemical entities built up synthetically, either from the individual components ultimately reacted to give the complex organic derivatives of desired antioxidative value, or they may be formed by synthetically utilizing naturally occurring materials as a basis for one of the components, the synthetic antioxidants being produced directly in situ by synthesis from such naturally occurring materials. Particularly useful as antioxidants are bodies which may generally be classed together as hydroxyl-containing substances, including unsaturated aliphatic alcohols like vinyl and allyl alcohols, or the more complex unsaturated alcohols, such as the lipoid alcohols, including phytosterol and cholesterol, the alkyl amines, particularly the alkylamino alcohols and the alkylamino acids, the esters of these various alcohols with organic and inorganic acids, and the esters and salts of the alkylamino derivatives. The unsaturated alcohols have particularly been emphasized and illustrated above, while exemplary of the alkylamino acids, the betaines may be mentioned. The latter are usually considered to be in the form of inner anhydrides, but their antioxidant activity is believed to be due to a combination of elements in the molecule, including the nitrogen group, and the unsaturated and alcohol groups present in the tautomeric form of the betaines. Betaine itself is as pointed out below, the best example of this group of materials. The alcohols may be utilized in the form of their esters or other derivatives, such as the esters of both organic and inorganic acids, the various phosphoric acid derivatives being particularly important, and may be used for exemplification purposes below. The various substances illustrated above, including the alkylamino acids, the alkylamino alcohols, the unsaturated alcohols, the lipoid alcohols, etc., may all be utilized directly as antioxidants, using, for example, a fraction of a percent of such antioxidants added to or contacted with the substance to be protected against oxidative change. Thus 0.5% of the indicated material may be added to a glyceride oil or fat to protect the latter against development of rancidity. Where the antioxidants, such as the betaines, include acid groups, the latter may be esterified with alcohols of various types to produce derivatives utilizable as antioxidants.

Among the alkylamino alcohols and alkylamino acids, the derivatives containing penta-valent nitrogen in the nature of derivatives of tri-alkyl-ammonium hydroxide are particularly useful illustrated by choline, namely hydroxy-ethyl-tri-methyl-ammonium hydroxide, colamine, etc., while the analogous alkylamino acids illustrated by the betanes, exemplified by betaine specifically (oxy-neurine or lycine) $COOH.CH_2.N(CH_3)_3.OH$ their various homologues and derivatives may be employed. That application discloses examples of the preparation of alkylamino-alkyl-phosphoric acid esters built up from their components, and utilizable as antioxidants. The alkylamino-alkyl-phosphoric acid esters may be segregated from the reaction mixtures as by treatment with hot benzol, filtration, neutralization of the filtrate, concentration and crystallization. Or the reaction mixture containing these stated esters may be utilized as such without segregation of individual components. In the examples given for preparation of the stated components, the amino alcohols such as choline are desirably employed in the form of a salt, either of an inorganic or an organic acid, such as a carbonate, bicarbonate, fatty acid salts, etc. Colamine as noted, may be substituted for choline or other amino alcohols may be utilized such as ethanolamine and adrenaline, or other ammonium base, or an arsonium base may be employed.

Since choline and related compounds are widely distributed in animal and vegetable materials, such natural produces containing choline may be utilized in lieu of the choline to produce corresponding compounds directly in situ in the vegetable or animal materials, and the resulting products employed as antioxidants. Thus hops, which contain choline, may be subjected to treatment with the phosphoric acid ester of distearin, to produce the combination of the phosphoric acid ester of distearin with choline and such reaction may be carried out in situ in natural occurring vegetable and animal products.

The various proteid substances may be directly subjected to treatment with any of the phosphoric acids, but particularly metaphosphoric acid, and more particularly by the utilization of glycerol-phosphoric acids for conversion into materials utilizable as antioxidants, or such glycerol-phosphoric acid combinations thus produced may be further treated with choline or other amino alcohols, as set forth above, for the production of still more complex materials suitable as antioxidants. Any of the proteid materials, including the proteins, albumins, etc., such as casein, glue, gelatin, etc., may be employed. For example, casein may be treated with glycerol-phosphate, as for example, by suspending casein in 10% aqueous alcohol, and adding glycerol-phosphate of sodium thereto in the proportion of 10 cc. of the glycerol-phosphate to each gram of casein. Gluten of wheat or zein of corn may be similarly treated. Instead of glycerol-phosphates, the fatty acid-glycerin-phosphoric acids, such as the plymityl, oleyl, and stearyl glycerin-phosphoric acids may be employed.

Such glycerol-phosphoric acid derivatives obtained by direct reaction with various proteid substances, either substantially pure proteins and albumins, such as casein, or natural products containing substantial amounts of such materials, obtained in the manner set forth above, may be further treated with choline or other amino-alcohols to produce antioxidants.

Instead of producing a distearin or other diglyceride by synthetic methods for the formation of the alkyl-amino-alkyl phosphoric acid esters, a natural oil or fat, or oil or fat-containing product, may be utiilzed. Such natural oil or fat may be subjected to alcoholysis to produce a diglyceride, or mixtures containing diglycerides, and then employed in the manner set forth for reaction with phosphorus pentoxide and choline, for example, to produce corresponding alkylamino-alkyl-phosphoric acid esters.

An advantage of the method of producing such diglycerides by alcoholysis of an oil is the fact that the antioxidants can be built up in the oil itself in part from the constituents of the oil. The entire oil may be converted into the diglyceride and utilized for the production of the alkyl-amino-alkyl phosphoric acid esters, and the resulting alkylamino-alkyl phosphoric acid ester then added either to the same or a different oil or fat in limited quantity as stated in order to protect the latter against oxidation, or the oil which is to be given antioxidant properties, may be converted only in part into a diglyceride, the latter remaining distributed through the bulk of triglyceride which remains unchanged, and such diglyceride-containing oil then subjected to the production of the alkylamino-alkyl-phosphoric acid ester to produce the latter distributed through the main body of the unchanged oil, whereupon the antioxidant is produced in situ in the oil. Refined oils may be treated in this way to give them antioxidant properties and resistance to development of rancidity.

Another manner of treating the oil to produce the antioxidants in situ therein is to employ oils containing some acids, such as rancid oils, or oils which have been partially hydrolyzed to produce acids therein, so that the oils or fat contain acids of the same character as those present as esters in the oils. Such acid-containing oils may then be treated with any of the alcoholic bodies, such as the unsaturated alcohols, the alkylamino alcohols, the lipoid alcohols, etc. to produce esters of the acids present in the oils with such alcohol bodies. Thus a rancid oil may have choline or phytosterol added thereto in molecular proportions, and the resulting mixture heated to about temperatures of the order of 105° C. for several hours in order to produce the esters. Any ordinary esterification reactions may be employed including the presence of esterification catalysts, inert gases, etc.

In lieu of the alkylamino-alcohols, the alkylamino acids as illustrated by betaine, referred to above, may similarly be employed. The betaines may be directly employed as antioxidants. Betaine itself is available as a by-product from beet sugar manufacture, betaine being found extensively in sugar beets, and also in other vegetable products, and in animal products, such as shell fish. It may be readily produced synthetically by oxidizing choline, and in other ways. Its ready availability in the residues from beet sugar manufacture, such as in the so-called "melasse" gives a ready source for its derivation. Other natural occurring betaines, such as trigonelline, obtained from the seeds of fenugreek, may similarly be employed, and the melasse or other sugar beet residues containing the betaine or the seeds of fenugreek may be employed as antioxidants utilizing the desired materials in powdered condition, or in suspension, in contact with the substances to be protected against oxidation, particularly as further pointed out below.

Instead of utilizing the betaines represented by betaine directly as an antioxidant, the betaines may be utilized for the production of alkylamino-alkyl-phosphoric acid esters analogous to those obtained from choline. The resulting products are alkylamino-alkyl-phosphoric acid esters that can be utilized for antioxidant purposes. The melasse may be treated directly with the distearyl-phosphoric acid ester for example, or other phosphoric acid ester of a diglyceride to produce corresponding antioxidants. Since the betaines are acid bodies, they may be utilized for production of esters by reaction with alcohols, particularly the unsaturated alcohols, and also the amino alcohols, as well as the lipoid alcohols, like phytosterol, for the production of esters utilizable as antioxidants.

The antioxidants including the betaines and the alkylamino-alkyl-phosphoric acid esters, may be employed for the protection of a wide variety of materials against oxidation, such as by the addition of a fraction of a percent to oils or fats to protect the latter against oxidation, or they may be dusted on food products to protect the latter against development of rancidity, or undesirable change in the oils or fats contained in such edible products. Or packaging materials carrying the stated antioxidants may be produced, such as paper carrying a sizing coating employed as a wrapper for products to be protected against development of rancidity.

The alkylamino-alkyl-phosphoric acid esters produced may be formulated as follows, where glycerol is the polyhydric alcohol used:

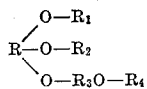

wherein R is the glycerol residue, $R_1$ and $R_2$ are the stearic acid residues ($.COC_{17}H_{35}$), $R_3$ is the phosphoric acid residue ($O.PO.OH$), and $R_4$ is the choline residue ($CH_2.CH_2.N(OH)(CH_3)_3$). $R_1$ and $R_2$ may be any monobasic carboxylic acid (acyl) residues, saturated or unsaturated, the higher fatty acids like stearic, palmitic, and oleic being preferred, and the acyl groups may be the same or different in the one molecule. While $R_3$ is the phosphoric acid residue, it may be substituted by any polybasic acid, either organic or inorganic, such as phthalic, maleic, malic, sulphuric or other sulphur acid, arsenic acid, etc., $R_4$ representing the choline residue may be substituted by any other amino alcohol, such as colamine, adrenaline, etc. $R_1$ and $R_2$ may likewise be betaines.

While R is given as the glycerol residue, it may be substituted by other polyhydric alcohols, such as polyglycerols, including di- and triglycerols, the glycols, such as ethylene and propylene glycol, the polyglycols, the ethers of the glycerols or polyglycerols, mannitol, etc. The glycol derivatives are particularly important and lead to novel antioxidant materials. They may be formulated as illustrated in the formula

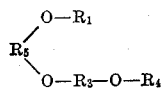

$R_5$ being the glycol residue, while $R_1$, $R_3$ and $R_4$ have the significance indicated above for the glycerol derivatives.

Analogously other polyhydric alcohols may be employed to produce alcohol-phosphoric acid esters. Further, while the alkylamino derivatives, like choline, have been emphasized since they are readily available, the alkyl groups of such hydroxyalkyl-trialkyl-ammonium compounds may be replaced by other carbon radicals both aliphatic and aromatic, with the latter as aryl groups, either with or without side chains.

As there set forth, these antioxidants may be contacted in any desired way with the substances to be protected. Oils and fats, oil and fat containing products, solids and liquids of various types, edible and inedible products, meats, flesh products, hydrocarbon oils and waxes, coffee, paint oils, gums and resins, etc., are exemplary of products that can be treated for protection. For edible substances, antioxidants of inocuous character are chosen. For liquids, the antioxidants may be dissolved or suspended therein or coated on containers. For solids, the antioxidants may be admixed with the product or dusted thereon, or applied as a coating or sizing on the container or the material from which the container is made, or to wrapping materials.

In application Serial No. 361,151, identified above, there is particularly described and claimed the conversion of betaines and other derivatives disclosed in the earlier application, into fatty acid derivatives of the betaines to increase their compatibility for or solubility in glycerides, etc. Any of the betaines described above such as betaine itself, trigonelline, etc., may be employed, or betaines produced synthetically as set forth above may be utilized. As there set forth, the betaines are desirably converted into fatty acid derivatives for use in accordances with the present invention, particularly in connection with glycerides, either animal or vegetable, liquid or solid, fat oils, etc., as well as in connection with hydrocarbon oils.

The fatty acids that can be employed in producing the desired derivatives include more particularly the higher fatty acids, specifically the fatty acids occurring in glyceride oils themselves, used either as such or in complex mixtures of two or more of such higher fatty acids, particularly the complexes which are produced from the fats or oils themselves by saponification and liberation of the acid. As exemplary of the glyceride oils which may be employed as a source of the fatty acids utilized in producing the betaine derivatives employed in accordance with that invention, there are mentioned almond oil yielding oleic, palmitic, linoleic, etc., acids, butterfat yielding butyric, caproic, capric, palmitic, stearic, oleic, etc., acids; cacao butter giving palmitic, oleic, stearic myristic, etc., acids; castor oil giving ricinoleic, stearic, oleic acids, etc.; cocoanut oil yielding caproic, caprylic, capric, lauric, etc., acids; codliver oil giving oleic, myristic, palmitic, stearic, etc., acids; cottonseed oil giving oleic, stearic, palmitic, linoleic, etc., acids; hemp oil giving isolinolenic, oleic, etc., acids; lard giving stearic, palmitic, oleic, linoleic, etc., acids; linseed oil yielding linoleic, linolenic, oleic, palmitic, myristic, etc., acids; maize oil giving arachidic, stearic, palmitic, oleic, etc., acids; menhaden oil giving palmitic, myristic, oleic, stearic, and other unsaturated acids; etc.; mustard oil yielding erucic, arachidic, stearic, oleic, etc., acids; neat's-foot oil giving palmitic, stearic, oleic, etc., acids; olive oil yielding linoleic, oleic, arachidic, etc., acids; palm oil giving palmitic, lauric, oleic, etc., acids; peanut oil yielding arachidic, linoleic, hypogoeic, palmitic, etc., acids; poppy oil giving linoleic, isolinolenic, palmitic, stearic, etc., acids; rape oil yielding erucic, arachidic, stearic acids, etc.; sperm oil giving oleic, palmitic, etc., acids; tallow yielding stearic, palmitic, oleic acids; whale oil yielding linoleic, isolinolenic, etc., acids. The complex acid mixtures obtained from any of the oils may be utilized, or the individual acids or desired mixtures thereof may be employed in producing the betaine derivatives.

As there taught, any of the fatty acids or mixtures thereof may be utilized with a betaine but mixed acid derivatives may be employed including the fatty acid component particularly higher fatty acid component as set forth above, together with either an inorganic acid or an organic acid different from said fatty acid initially employed. Complexes may thus be produced in which derivatives of the fatty acids and of other organic acids or inorganic acids are also present, particularly for utilization as antioxidants in connection with glyceride or hydrocarbon oils.

Where the betaine derivatives are employed in connection with glycerides or other oils for edible purposes, the derivatives of betaine are produced with acids that are wholesome and available for edible purposes.

Where, however, the ultimate product is employed for non-edible purposes as in connection with hydrocarbon oils employed as lubricants, or motor fuels, or glyceride oils employed for coating and other purposes, then acids may be employed in producing the complexes which are not limited to edible acids. Thus linseed oil acids, tung oil acids, etc. may be utilized to produce the betaine derivatives. The same considerations apply to the utilization of inorganic acids or organic acids other than the fatty acids in the production of mixed derivatives of the betaine with the fatty acid and inorganic acids or organic acids other than the fatty acids may be employed in such complexes where they are utilized for edible purposes, such other acids being chosen with respect to their availability for use in the human or other animal bodies; whereas different types of acids may be employed if the product is not to be used for edible purposes.

As illustrative of inorganic acids that may be utilized in producing mixed complexes and derivatives as taught therein, reference is made to phosphoric, sulphuric, nitric, and other inorganic acids, while organic acids other than the fatty acids that may be employed include any of the aliphatic, aromatic and heterocyclic acids such as benzoic, phthalic, succinic, tartaric, lactic, naphthenic, etc., acids.

The betaine derivatives are produced as taught therein by heating the betaine with the desired fatty acid at relatively low temperatures generally not exceeding the boiling point of water and usually substantially lower, temperatures of 60 to 70° C. being desirable for that purpose. Illustrating the preparation of an oleic acid derivative of betaine, an example is given in which an oleic acid derivative of betaine is produced by treating 82 parts by weight of oleic acid, heated to 60° C. and 18 parts of betaine added thereto. The mixture is heated at a temperature between 60 and 70° C. for approximately 2 hours to produce the desired oleic acid derivative of betaine. The resulting complex may be utilized as such for addition to glycerides and other products as an antioxidant, small quantities thereof being employed, as for example, 0.5%.

A palmitic acid derivative of melasse is illustrated by 75 parts by weight of palmitic acid heated to 70° C. and 25 parts by weight of melasse incorporated therewith, the heat treatment being continued for 3 hours and the resulting product being available for use without purification, as an antioxidant as set forth above.

Illustrating the production of a mixed fatty acid inorganic acid derivative of betaine, 40 parts of oleic acid were heated to 70° C. until molten, and 20 parts of betaine incorporated therewith, and the mixture heated for 1 hour after which 35 parts by weight of phosphoric acid (density 1.3) were incorporated and the entire mixture heated, evaporation carried out until crystallization sets in. Alcohol was then added to precipitate the desired product or the reaction complex without precipitation by means of alcohol may be employed.

And that case particularly emphasized the utilization of fatty acid as derivatives of the betaines as such or as mixed fatty acid esters or as mixed derivatives of betaines with fatty acids and inorganic acids or organic acids other than fatty acids, as antioxidants in the protection of various types of oils, fats and similar materials subject to oxidative deterioration.

It has now been found that antioxidants and other materials as set forth in the prior applications above identified, may be materially increased in their activity as antioxidants and in other ways by combination of such compounds with the sugars, including aldoses and ketoses, both monosaccharides, disaccharides, etc. Such sugars may thus be converted into esters when compounds containing acid groups such as the betaines are employed in producing these new chemical combinations. The formation of such combinations with betaines will be illustrative.

Any of the sugars such as a hexose may be esterified by a betaine by the usual methods of esterification. Thus approximately 18 parts of a hexose like dextrose are heated with from approximately 11 to 24 parts of betaine in a sealed reaction vessel under pressure at temperatures of approximately 110° to 150° C. for four hours, and the reaction product containing the hexose ester with the betaine removed from the vessel and utilized as an antioxidant in a glyceride oil or for other purposes as set forth above. One or more of the betaine residues may be esterified into the hexose molecule. Any of the other sugars may similarly be treated.

Such esters of a sugar with a betaine may be utilized as an antioxidant in oils as set forth above, or may be further treated in a variety of ways to produce derivatives thereof. Thus the complex produced by reacting a sugar with a betaine as illustrated above, may be further treated with an acid either organic or inorganic or a combination of such acids, selected from the acids set forth above to produce several types of derivatives. The organic acids such as a fatty acid or the inorganic acids such as phosphoric acid may be utilized in this way to esterify further hydroxyl groups in the sugar molecule, or to produce an ester with the hydroxyl group attached to the nitrogen in the betaine residue, or both such substitutions may take place. It is only necessary to heat the sugar complex with the betaine at moderate temperatures of from 60 to 70° C., with the acid or mixture of acids while stirring, for periods of from 2 to 3 hours to produce the desired combinations. The resulting compounds may be illustrated by the following formulae.

A mono ester of a sugar with a betaine may be represented by the formula $S.Co.Bx$, where S stands for the sugar residue, and $Co.Bx$ stands for the betaine residue.

Thus the ester produced from betaine and dextrose in the example given above is illustrated by the formula

$$CHO.(CHOH)_4CH_2O.CO.CH_2N(CH_3)_3OH$$

Where the acid is reacted into one of the remaining hydroxyl groups in the sugar residue of the ester of the sugar with the betaine, the resulting compound may be represented by the formula $A.S.CO.Bx$, where A stands for the acid radical, S for the sugar residue, and $CO.Bx$ for the betaine residue. Where the acid radical is attached to the OH of the betaine residue and not to the sugar molecule, the formula is $S.CO.Bx.A$, where the letters have the significance indicated immediately above. And the compounds where the acid is combined into both the sugar residue and the betaine residue is represented by the formula $A.S.CO.Bx.A$, where the letters have the significance indicated immediately above.

In producing such derivatives where organic or inorganic or mixtures of such acids are utilized to produce further combinations, it is not necessary to prepare individual compounds in a series of reactions, but the components may be heated together to produce a complex containing mixtures of reaction products of the character described immediately above. Thus, a sugar, a betaine, and an organic or inorganic acid or mixture of acids selected from those set forth above, may be reacted simultaneously under conditions normally employed for esterification purposes. Thus 18 parts of levulose, 12 parts of betaine, and 28 parts of oleic acid (the parts being by weight) are heated together in a sealed reaction vessel under pressure for 8 hours at a temperature of approximately 140° C., and the resulting reaction complex containing various combinations as set forth above may be utilized as such as an antioxidant in accordance with the present invention.

The presence of aldose and ketose groups in these combinations enable the sugar-betaine reaction products to be utilized for the preparation of still further complexes, as for example, in their conversion into hydrazones and osazones by reaction with aldehydes and ketones, aliphatic, aromatic and heterocyclic. The preparation of such derivatives will be illustrated below in connection with related compounds. The usual methods for forming such hydrazones and osazones may be employed.

Instead of converting the betaine into a combination directly with the sugar, the betaine may first be converted into an amide or hydrazide, such amides or hydrazides of the betaines being known produced for example, by the treatment of betaine esters with ammonia or with hydrazine. The amide may be represented by the formula $NH_2.CO.Bx$, where $CO.Bx$ again represents the betaine residue. The hydrazide may be represented by the formula $NH_2.NH.CO.Bx$, where again $CO.Bx$ is the betaine residue. Thus the amide of betaine would have the formula $NH_2CO.CH_2N(CH_3)_3OH$, while the corresponding hydrazide of betaine per se would be $$NH_2NH.CO.CH_2N(CH_3)_3OH$$

The amides and hydrazides of the betaines are valuable per se as antioxidants and exhibit marked activity as such antioxidants in glyceride oils and hydrocarbon oils. For the latter, the solubility should be increased by having present sufficient long chains as in the betaine residue to give the desired solubility.

The amides and hydrazides of the betaines as set forth above, may be converted into acid salts, esters or soaps by the use of either organic or inorganic acids of the character set forth above. Again various combinations may be produced depending on whether the acid is attached to the hydroxyl group of the betaine residue, or whether it is attached to a nitrogen of the amido or hydrazido group. These combinations of the acids with the betaine amides or hydrazides may be produced analogously to the methods set forth in the companion application for the preparation of the fatty acid derivatives of the betaines themselves, by heating the amides or hydrazides with the selected acid at moderate temperatures such as 60 to 70° C. for 2 to 4 hours. Thus betaine amide made be heated with lauric acid using approximately 12 parts of the betaine amide with from 20 to 60 parts of lauric acid depending on the type of derivatives desired. The resulting complex produced under the conditions set forth immediately above includes a complex mixture of derivatives of the character illustrated with the lauric acid bound into the betaine amide molecule; and such complexes may be used themselves without segregation of the individual component as antioxidant in connection with glyceride oils for example, as set forth above.

The compounds thus produced may be formulated as follows. Where the acid is bound into the compounds through the hydroxyl of the betaine residue, it is illustrated by the formula $NH_2.CO.Bx.A$, where $CO.Bx$ represents the betaine residue and A represents the acid residue. Where the acid is attached to the amino group at the amide end of the molecule, the compound may be formulated as $A.NH_2.CO.Bx$, where the letters have the significance indicated above. And where the acid is bound both through the betaine residue and the amino group of the amido end of the molecule, the compound may be formulated as $A.NH_2.CO.Bx.A$, where the letters have the significance indicated above. Thus in the specific example where lauric acid is used to produce the complex, the A in the formulas given immediately above will be the lauric acid group.

The betaine hydrazides may be reacted with aldehydes and ketones, aliphatic, aromatic and heterocyclic to give valuable hydrazones or osazones. For example as aldehydes there may be mentioned acetaldehyde, benzaldehyde, furfural, and sugars containing an aldehyde group such as grape sugar; as ketones there may be mentioned acetones, benzophenone, sugars containing ketone groups, etc. Such production of hydrazones may be carried out by the usual methods of producing hydrazones, or they may be produced in situ in the oils in which they are to be utilized as antioxidants. As an example of preparing such a hydrazone in situ, the following is given.

A hydrocarbon distillate containing approximately 1% by weight of betaine hydrazide is agitated with benzaldehyde and glacial acetic acid using 1 pound of benzaldehyde to 100 pounds of distillate, until reaction is complete, usually requiring several hours. The mixture is allowed to settle, the aqueous layer withdrawn and the hydrocarbon layer washed with dilute alkali until neutral. The hydrazones produced in such example will have the formula $$C_6H_5.CH=N.NH.CO.Bx$$

where $CO.Bx$ represents the betaine residue. Similarly aliphatic, carbocyclic, heterocyclic aldehydes and ketones may be employed in producing hydrazones generally formulated as $$R.CH=N.NH.CO.Bx$$

where R.CH represents the aldehyde residue, and $CO.Bx$ represents the betaine residue. Where a ketone is employed for producing the hydrazone, the resulting hydrazone will have the formulation $$\begin{array}{c}R\\ \diagdown\\ C=N.NHCO.Bx\\ \diagup\\ R\end{array}$$

where R represents the organic group present in the ketone employed.

The hydrazone formed from benzaldehyde and betaine hydrazide in the example given has the particular formula $$C_6H_5.CH=N.NH.CO.CH_2N(CH_3)_3OH$$

If benzophenone is used to produce the corresponding hydrazone, the resulting compound has the formula $$(C_6H_5)_2C=N.NH.CO.CH_2N(CH_3)_3OH$$

More importantly in connection with the present invention, the hydrazides are used to produce reaction products with aldoses or ketoses. These sugars give two types of compounds: normal hydrazones if the reaction is carried out using one mole of hydrazine to one mole of grape sugar, for example,

If however, an excess of the hydrazine is used, an osazone is formed

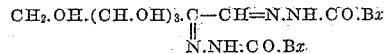

in which formulation CO.B$x$ represents again the betaine residue. An example of producing the osazones in situ in a hydrocarbon distillate for example, is as follows:

100 parts by weight of hydrocarbon distillate containing 1% of betaine hydrazide is warmed on a water bath to about 90° with 1 part by weight of grape sugar and 2 parts of glacial acetic acid, agitation being continuously carried on for about an hour. The osazone like the hydrazone in the earlier example, is distributed between the two layers, both in the hydrocarbon layer and in the water layer, the mixture is allowed to settle, the hydrocarbon layer containing osazone is separated, washed with dilute alkali and then with water. This is an example of the production of an osazone in situ in a hydrocarbon which may be of the gasoline range for motor fuel or of lubricating oil range, while the osazone present in the water layer may be separated.

Particularly important for present purposes is the fact that the betaine hydrazide may be utilized to form a hydrazone or osazone with the ester of a sugar with a betaine, thus having two betaine residues present in the molecule as represented by the formula

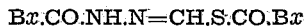

where CO.B$x$ represents the betaine residue, and S represents the sugar residue. Such complexes are particularly desirably used in accordance with the present invention as antioxidants for either glyceride oils or for the hydrocarbon distillates.

The hydrazones and osazones produced from the sugars may be esterified with acids both inorganic and organic, monobasic and polybasic to give full or partial esters. Thus fatty acids, lower and higher as hereinabove set forth for producing soaps, aromatic acids, etc., may be used to modify the solubility of these compounds. Polybasic acids if used such as phosphoric, sulphuric, phthalic, polysulfonic, etc., to form partial esters should have the remaining acidity neutralized as by alkalis, alcohols, etc., or converted into metal, particularly heavy metal derivatives.

The hydrazides may be reacted with beta diketones or beta ketone acid esters to form ring compounds containing nitrogen for example, pyrazones and pyrazolones. Thus with acetacetic ester methyl pyrazolones are formed the reaction with such ester and betaine hydrazide being exemplary.

The hydrazones, osazones, pyrazoles and pyrazolones may be looked upon as substituted hydrazines in that the osazones are compounds containing a reaction product of a hydrazine group with both a ketone and an aldehyde.

Having thus set forth my invention, I claim:

1. A composition containing a glyceride subject to oxidative change and a small amount of the reaction product of a betaine amide, a sugar, and a fatty acid as an antioxidant to protect the glyceride against oxidative change.

2. A composition containing a glyceride subject to oxidative change and a small amount of a soap of a betaine osazone as an antioxidant to protect the glyceride against oxidative change.

3. A composition containing a glyceride subject to oxidative change and a small amount of a soap of a betaine hydrazone as an antioxidant to protect the glyceride against oxidative change.

4. A composition containing a glyceride subject to oxidative change and a small amount of an ester of a betaine osazone as an antioxidant to protect the glyceride against oxidative change.

5. A composition containing a glyceride subject to oxidative change and a small amount of an ester of a betaine hydrazone as an antioxidant to protect the glyceride against oxidative change.

6. A composition containing a glyceride subject to oxidative change and a small amount of a salt of a betaine osazone as an antioxidant to protect the glyceride against oxidative change.

7. A composition containing a glyceride subject to oxidative change and a small amount of a salt of a betaine hydrazone as an antioxidant to protect the glyceride against oxidative change.

8. A composition containing a glyceride subject to oxidative change and a small amount of a betaine osazone as an antioxidant to protect the glyceride against oxidative change.

9. A composition containing a glyceride subject to oxidative change and a small amount of a betaine hydrazone as an antioxidant to protect the glyceride against oxidative change.

10. A composition containing a glyceride subject to oxidative change and a small amount of a soap of a betaine hydrazide as an antioxidant to protect the glyceride against oxidative change.

11. A composition containing a glyceride subject to oxidative change and a small amount of a soap of a betaine amide as an antioxidant to protect the glyceride against oxidative change.

12. A composition containing a glyceride subject to oxidative change and a small amount of an ester of a betaine hydrazide as an antioxidant to protect the glyceride against oxidative change.

13. A composition containing a glyceride subject to oxidative change and a small amount of an ester of a betaine amide as an antioxidant to protect the glyceride against oxidative change.

14. A composition containing a glyceride subject to oxidative change and a small amount of a salt of a betaine hydrazide as an antioxidant to protect the glyceride against oxidative change.

15. A composition containing a glyceride subject to oxidative change and a small amount of a salt of a betaine amide as an antioxidant to protect the glyceride against oxidative change.

16. A composition containing a glyceride subject to oxidative change and a small amount of a betaine hydrazide as an antioxidant to protect the glyceride against oxidative change.

17. A composition containing a glyceride subject to oxidative change and a small amount of a betaine amide as an antioxidant to protect the glyceride against oxidative change.

SOL SHAPPIRIO.

REFERENCES CITED

The following references are of record in the file of this patent:

UNITED STATES PATENTS

| Number | Name | Date |
|---|---|---|
| 2,152,602 | Ott | Mar. 28, 1939 |
| 2,217,711 | Shappirio | Oct. 15, 1940 |
| 2,352,229 | Shappirio | June 27, 1944 |